US011169279B2

(12) United States Patent
Shinkai et al.

(10) Patent No.: US 11,169,279 B2
(45) Date of Patent: Nov. 9, 2021

(54) WORK-VEHICLE POSITION MEASUREMENT SYSTEM, WORK VEHICLE, AND WORK-VEHICLE POSITION MEASUREMENT METHOD

(71) Applicant: Kubota Corporation, Osaka (JP)

(72) Inventors: Atsushi Shinkai, Sakai (JP); Kazuo Sakaguchi, Amagasaki (JP); Izuru Shimamoto, Amagasaki (JP); Kenji Tamatani, Amagasaki (JP); Megumi Suzukawa, Amagasaki (JP); Akisato Hori, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 324 days.

(21) Appl. No.: 15/847,933

(22) Filed: Dec. 20, 2017

(65) Prior Publication Data

US 2018/0210092 A1  Jul. 26, 2018

(30) Foreign Application Priority Data

Jan. 20, 2017 (JP) .............................. JP2017-008354

(51) Int. Cl.
*G01S 19/00* (2010.01)
*G01S 19/46* (2010.01)
(Continued)

(52) U.S. Cl.
CPC ............ *G01S 19/46* (2013.01); *A01B 69/008* (2013.01); *G01S 19/04* (2013.01); *G01S 19/05* (2013.01);
(Continued)

(58) Field of Classification Search
None
See application file for complete search history.

(56) References Cited

U.S. PATENT DOCUMENTS

2008/0262728 A1\* 10/2008 Lokshin ............... G01C 21/165
701/472
2008/0269988 A1\* 10/2008 Feller ................... A01B 69/007
701/41
(Continued)

FOREIGN PATENT DOCUMENTS

| JP | 06-028031 | 2/1994 |
| JP | 2006-323527 | 11/2006 |
| JP | 2016-031649 | 3/2016 |

OTHER PUBLICATIONS

Japanese Office Action for corresponding JP Application No. 2017-008354, dated Mar. 26, 2020 (w/ machine translation).

*Primary Examiner* — Truc M Do
(74) *Attorney, Agent, or Firm* — Mori & Ward, LLP (57) ABSTRACT

A work-vehicle position measurement system includes a reference station and a work vehicle. The reference station is provided at a reference position to measure a measured position of the reference position by receiving a radio wave from a satellite and to transmit reference information including the measured position. The work vehicle includes circuitry configured to obtain a calculated position of the work vehicle based on satellite information from the satellite and the reference information transmitted from the reference station, to control the work vehicle to travel along a predetermined travel route in a work field based on the calculated position of the work vehicle, and to manage map data of the work field to correspond to the reference information of the reference position.

10 Claims, 6 Drawing Sheets

(51) Int. Cl.
    *A01B 69/04*       (2006.01)
    *G05D 1/02*        (2020.01)
    *G01S 19/07*       (2010.01)
    *G01S 19/04*       (2010.01)
    *G01S 19/05*       (2010.01)

(52) U.S. Cl.
    CPC ............ *G01S 19/07* (2013.01); *G05D 1/0219* (2013.01); *G05D 1/0278* (2013.01); *G05D 2201/0201* (2013.01)

(56) References Cited

U.S. PATENT DOCUMENTS

| | | | | |
|---|---|---|---|---|
| 2009/0251366 | A1* | 10/2009 | McClure | G05D 1/0278 342/357.31 |
| 2011/0015817 | A1* | 1/2011 | Reeve | G05D 1/0231 701/25 |
| 2012/0174445 | A1* | 7/2012 | Jones | A01B 69/007 37/197 |
| 2014/0324291 | A1* | 10/2014 | Jones | E02F 9/2045 701/41 |
| 2016/0041803 | A1* | 2/2016 | Markov | A01B 76/00 701/48 |
| 2016/0174453 | A1 | 6/2016 | Matsuzaki et al. | |
| 2017/0139418 | A1* | 5/2017 | Hiramatsu | G05D 1/0214 |
| 2017/0248946 | A1* | 8/2017 | Ogura | G05D 1/0038 |
| 2017/0299728 | A1* | 10/2017 | Lie | G01S 19/426 |
| 2017/0322550 | A1* | 11/2017 | Yokoyama | A01B 63/02 |

\* cited by examiner

WORK-VEHICLE POSITION MEASUREMENT SYSTEM, WORK VEHICLE, AND WORK-VEHICLE POSITION MEASUREMENT METHOD

CROSS-REFERENCE TO RELATED APPLICATIONS

The present application claims priority under 35 U.S.C. § 119 to Japanese Patent Application No. 2017-008354, filed Jan. 20, 2017. The contents of this application are incorporated herein by reference in their entirety.

BACKGROUND OF THE INVENTION

Field of the Invention

The present invention relates to a work-vehicle position measurement system, a work vehicle, and a work-vehicle position measurement method.

Discussion of the Background

A work-vehicle position measurement device of this type includes a global positioning system (GPS) provided with a reference station positionally fixed on the ground, like a real-time kinematic GPS (hereinafter, abbreviated as an RTK-GPS) or a differential GPS (hereinafter, abbreviated as a DGPS) out of GPSs exemplifying a global navigation satellite system (GNSS) configured to measure an own vehicle position on the planet in accordance with received information on radio waves from a plurality of satellites. Such a GPS achieves higher positioning accuracy with use of positioning information at the reference station, in comparison to a GPS for single point positioning typically applied to automobiles and the like.

In such a work-vehicle position measurement device, the work vehicle is conventionally configured to obtain the own vehicle position assuming that the reference station is constantly placed at a position preliminarily precisely ascertained (see JP 2016-31649 A).

SUMMARY OF THE INVENTION

According to one aspect of the present invention, a work-vehicle position measurement system includes a reference station and a work vehicle. The reference station is provided at a reference position to measure a measured position of the reference position by receiving a radio wave from a satellite and to transmit reference information including the measured position. The work vehicle includes circuitry configured to obtain a calculated position of the work vehicle based on satellite information from the satellite and the reference information transmitted from the reference station, to control the work vehicle to travel along a predetermined travel route in a work field based on the calculated position of the work vehicle, and to manage map data of the work field to correspond to the reference information of the reference position.

According to another aspect of the present invention, a work vehicle includes position calculation circuitry, vehicle control circuitry, and data management circuitry. The position calculation circuitry is configured to obtain a calculated position of the work vehicle based on satellite information from a satellite and reference information transmitted from a reference station provided at a reference position to measure a measured position of the reference position by receiving a radio wave from the satellite, the reference information including the measured position. The vehicle control circuitry is configured to control the work vehicle to travel along a predetermined travel route in a work field based on the calculated position of the work vehicle. The data management circuitry is configured to manage map data of the work field to correspond to the reference information of the reference position.

According to further aspect of the present invention, a work-vehicle position measurement method includes measuring by a reference station, a measured position of a reference position at which the reference station is provided, the measured position being measured by receiving a radio wave from a satellite. Reference information including the measured position is transmitted from the reference station. A calculated position of the work vehicle is obtained based on satellite information from the satellite and the reference information. The work vehicle is controlled to travel along a predetermined travel route in a work field based on the calculated position of the work vehicle. Map data of the work field is managed to correspond to the reference information of the reference position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

The following description refers to a case where a work-vehicle position measurement device according to an embodiment of the present invention is applied to a work vehicle (tractor) including a tilling device as a ground work device provided behind a travel vehicle body. Specifically, this embodiment relates to a case where the work-vehicle position measurement device is applied to a work vehicle cooperation system enabling efficient ground work in a field by means of two work vehicles traveling side by side.

Figure 2:
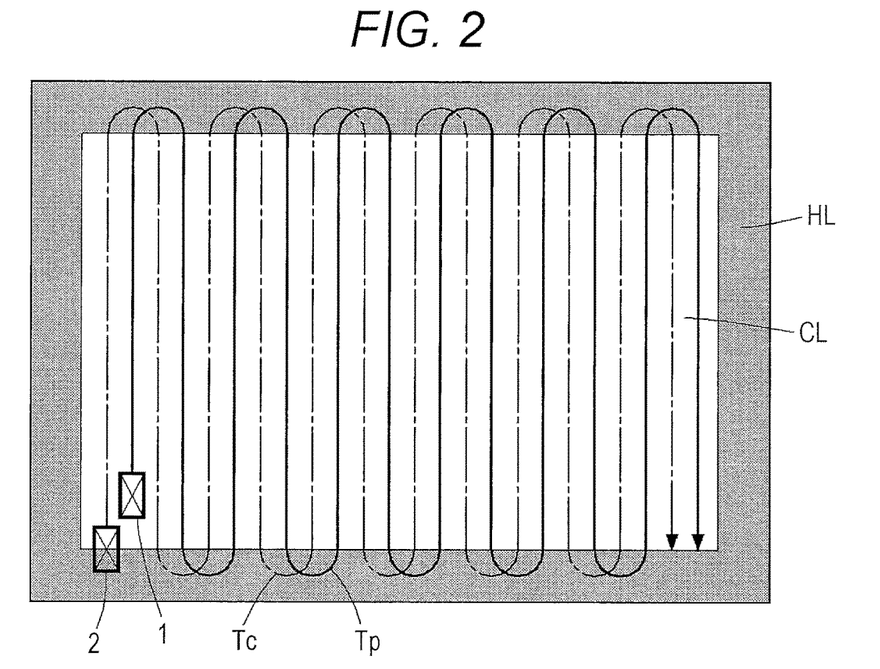
FIG. 2 is a plan view of a field provided with travel routes.
Figure 3:
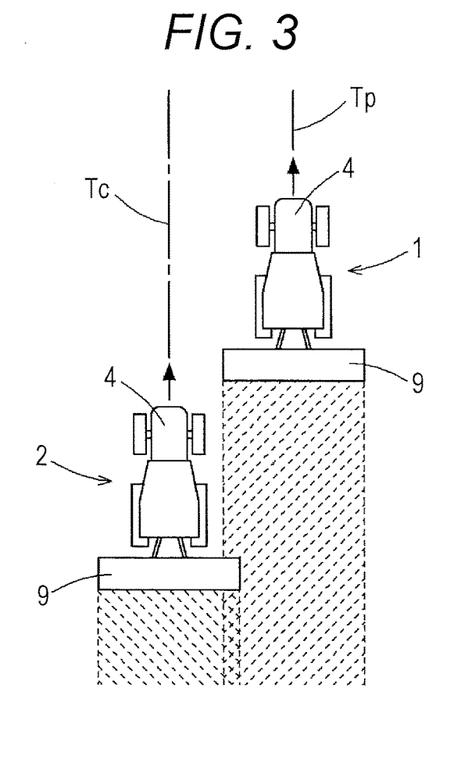
FIG. 3 is a plan view of work vehicles traveling cooperatively.

As depicted in FIGS. 2 and 3, a master work vehicle 1 and a slave work vehicle 2 traveling side by side with the master work vehicle 1 are configured to execute ground work in the field. A work field is typically divided into a center work field CL positioned in a center portion of the field and a headland HL surrounding the center work field CL and defined along a ridge. In the center work field CL, the master work vehicle 1 and the slave work vehicle 2 each travel along a preliminarily set target travel route and execute ground work during reciprocative travel. As to be described in detail later, travel is controlled so that the master work vehicle 1 travels antecedently, the slave work vehicle 2 travels alongside the master work vehicle 1, and the slave work vehicle 2 has a work track overlapped by a predetermined amount with a work track of the master work vehicle 1.

Entire Configuration

Figure 1:
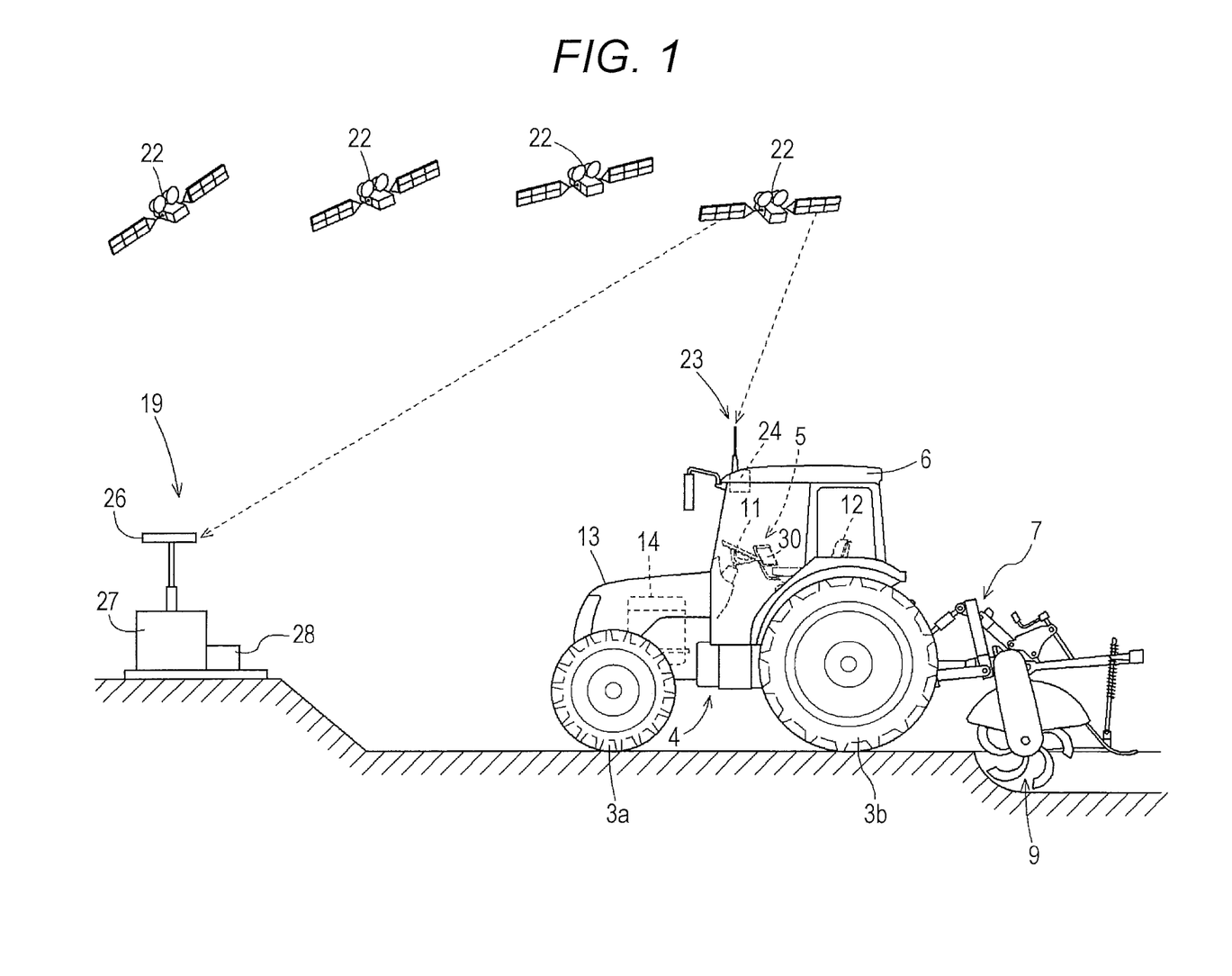
FIG. 1 is a side view of a work vehicle.

The master work vehicle 1 and the slave work vehicle 2 are configured similarly to each other except for a partial difference in control configuration as to be described later. FIG. 1 depicts a four-wheel travel vehicle body 4 including a pair of left and right redirectable front wheels 3a and a pair of left and right unredirectable rear wheels 3b, and configured to execute straight travel and turn travel. The travel vehicle body 4 is provided, in a center portion, with a steering unit 5. The steering unit 5 is covered with a cabin 6. The travel vehicle body 4 is provided therebehind with a tilling device 9 functioning as a ground work device driven to freely shift upward and downward by a lift hydraulic cylinder (not depicted). The tilling device 9 is coupled to the travel vehicle body 4 via a link mechanism 7. The steering unit 5 is provided thereahead with a steering wheel 11 and various operation levers (not depicted). The steering unit 5 is provided therebehind with a driver's seat 12 allowing a driver to be seated.

The travel vehicle body 4 has a front portion provided with a hood 13 accommodating an engine 14. The engine 14 generates motive power transmitted to the front and rear wheels 3a and 3b via a transmission mechanism (not depicted) to allow the work vehicle to be driven to travel. The motive power of the engine 14 is transmitted to the tilling device 9 via the transmission mechanism so as to drive the tilling device 9. Though not depicted, the transmission mechanism includes an electronic control gearbox, a forward/backward travel switcher, a brake, and the like, and is configured to freely change vehicle speed and change a vehicle body travel direction. The travel vehicle body 4 is configured to freely change a steering angle of the front wheels 3a. Though not depicted, the travel vehicle body 4 also includes a work clutch configured to freely turn ON and turn OFF motive power transmission to a transmission system for the tilling device 9, and various sensors such as a vehicle speed sensor configured to detect vehicle speed, a steering angle sensor configured to detect the steering angle of the front wheels, and an obstruction detection sensor configured to detect an obstruction near the vehicle body.

Control Configuration of Master Work Vehicle

Figure 4:
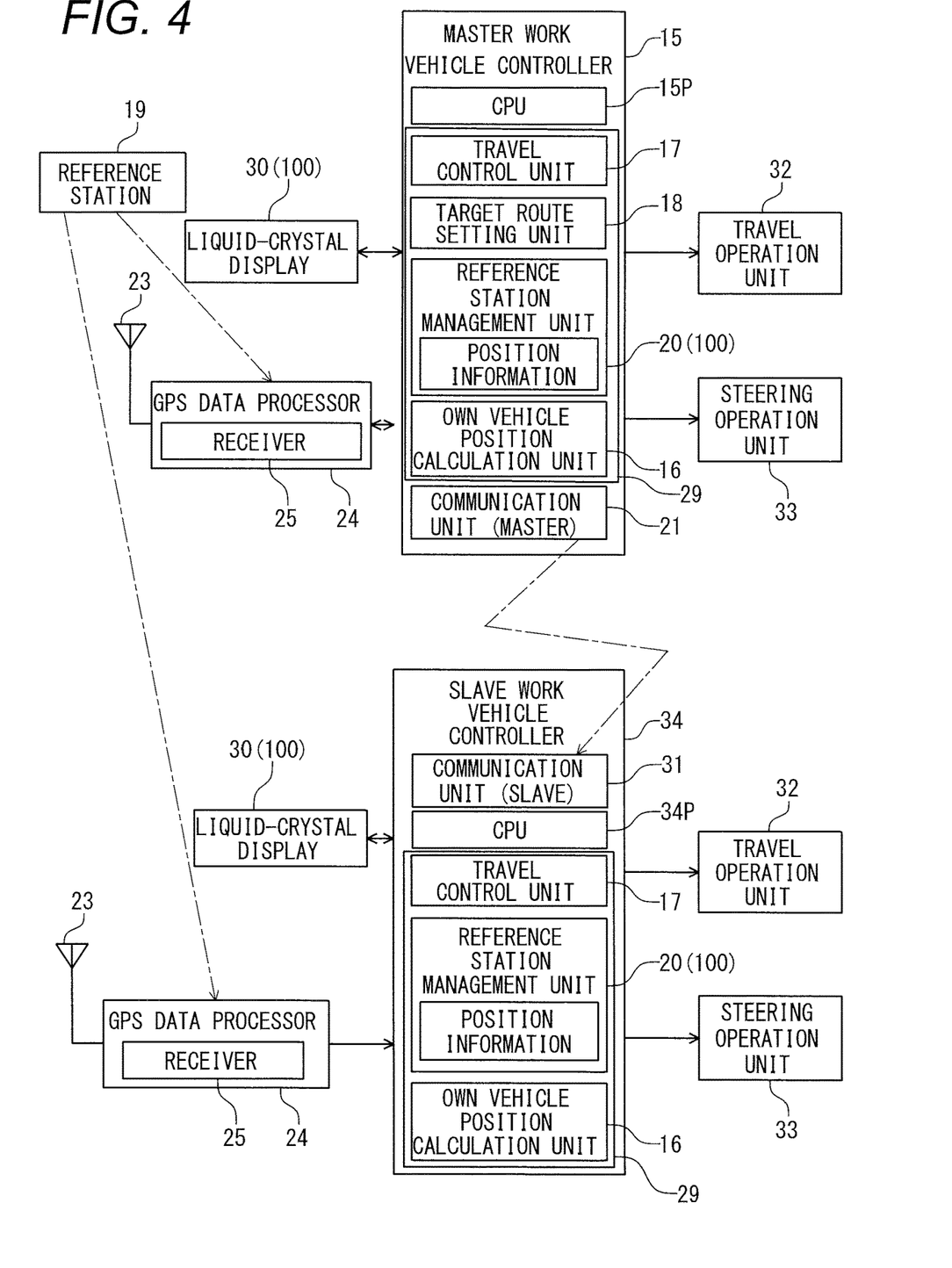
FIG. 4 illustrates internal structure of the work vehicles.

As depicted in FIG. 4, the master work vehicle 1 includes the transmission mechanism described above, and a master work vehicle controller 15 functioning as a control device configured to control a steering state of the front wheels 3a, a work state of the tilling device 9, and the like. The master work vehicle controller 15 includes an own vehicle position calculation unit 16 functioning as a position calculation unit configured to obtain an own vehicle position in accordance with GPS positioning information, a travel control unit 17 configured to control a travel state of the vehicle body so that the vehicle body travels along a set route in accordance with a calculation result of the own vehicle position calculation unit 16, a target route setting unit 18 configured to set a target travel route in a field, a reference station management unit 20 configured to manage a position of a reference station 19, and a master communication unit 21 configured to transmit and receive various types of information. Each of the own vehicle position calculation unit 16, the travel control unit 17, the target route setting unit 18, and the reference station management unit 20 can operate in cooperation with hardware, but a function of each of the units is achieved by a computer program. More specifically, the master work vehicle controller 15 includes a CPU (circuitry) 15P. Programs of the own vehicle position calculation unit 16, the travel control unit 17, the target route setting unit 18, and the reference station management unit 20 are stored in a storage device (a memory) 29 of the master work vehicle controller 15 and executed by the CPU (circuitry) 15P. The communication unit 21 is configured by a device for wireless information transmission by means of a radio wave or the like, and is wirelessly connected to the slave work vehicle 2 so as to identify the communication target as well as transmit and receive work travel information.

The own vehicle position calculation unit 16 is configured to execute position calculation of obtaining an own vehicle position in accordance with transmitted information sent from the reference station 19 placed on the ground and received information on radio waves from a plurality of GPS satellites 22, adopting a known technique of the real-time kinematic GPS (RTK-GPS). The master work vehicle 1 is provided, on top of the cabin 6, with a GPS antenna 23 configured to receive radio waves from the GPS satellites 22, and a GPS data processor 24 configured to process information received by the GPS antenna 23 and transmit the processed information to the control device. The GPS data processor 24 includes a receiver 25 configured to receive transmitted information from the reference station 19 positionally fixed on the ground.

As depicted in FIG. 1, the reference station 19 includes a GPS antenna 26 and a GPS data processor 27 as in the master work vehicle 1, as well as a transmitter 28 configured to wirelessly transmit, to outside, own position data obtained by the GPS data processor 27. The receiver 25 included in the GPS data processor 24 of the master work vehicle 1 is configured to receive information transmitted from the transmitter 28 of the reference station 19.

In a case where there is a plurality of work fields, the reference station 19 is placed for each of the fields. The reference station 19 needs to constantly be placed at a position preliminarily precisely ascertained for higher positioning accuracy, when the RTK-GPS measures a position of the work vehicle in the field.

The reference station 19 is configured to be portable to be placed at any appropriate position on a ground surface. The reference station 19 thus configured can be commonly used for the plurality of fields for cost reduction. The reference station 19 can be mounted on a cart or the like and moved, and is placed at a position higher than the field for better receipt of radio waves from the GPS satellites 22, where the reference station 19 is mounted and supported in stable orientation.

The reference station 19, which is portable to be placed at any appropriate position on the ground surface, may erroneously be placed at a position different from a previously placed position by a worker. There is thus provided the reference station management unit 20 configured to manage the position of the reference station 19.

The reference station management unit 20 is configured to manage map data of a work target field and position data of the reference station 19 for the field in association with each other. The map data of the field can be preliminarily prepared and set to be read from an external device, or can be prepared by measuring positions with use of the GPS while the work vehicle is traveling along the peripheral edge of the target field.

As depicted in FIG. 4, the reference station management unit 20 includes position information on the reference station 19 which is preliminarily set with respect to the field. The position information is stored in the storage device 29. The storage device 29 is configured by a nonvolatile memory that can hold stored contents even in a case where a keyswitch (not depicted) provided at the travel vehicle body 4 is turned OFF to block electric power supply to the master work vehicle controller 15.

There is provided a touch panel liquid-crystal display 30 functioning as a display device configured to display the field and the position of the reference station 19 in the map. The liquid-crystal display 30 is provided at the steering unit 5 so as to be visually checked by a driver seated at the driver's seat 12, and is configured to display various types of information including letters, images, and the like.

The reference station management unit 20 is configured to manage map data of the field and position data of the reference station for each of the fields, and the liquid-crystal display 30 is configured to display, as map information, the plurality of fields and the position of the reference station selected from the plurality of the fields.

Figure 7:
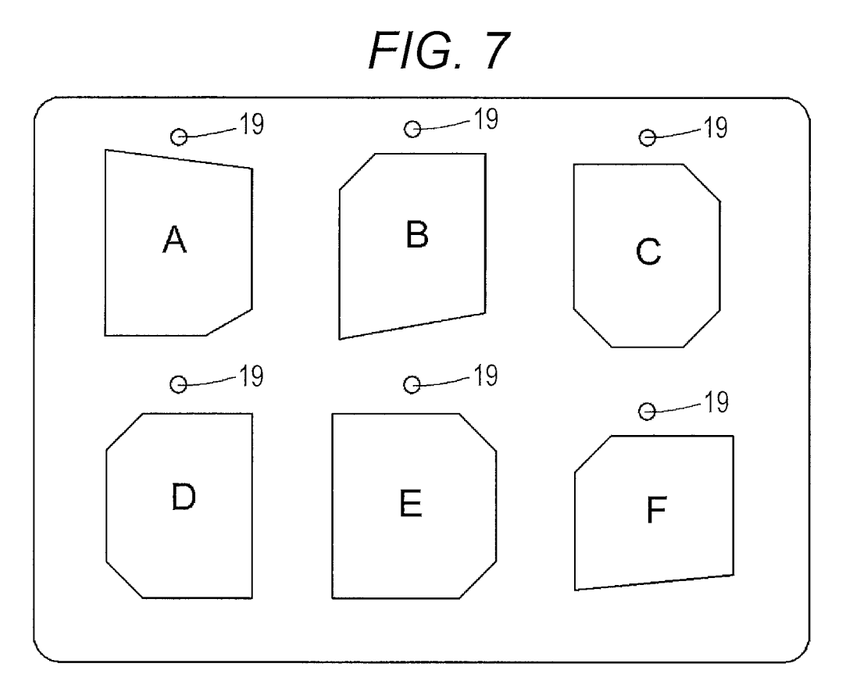
FIG. 7 is a view of image display contents on a plurality of fields.
Figure 8:
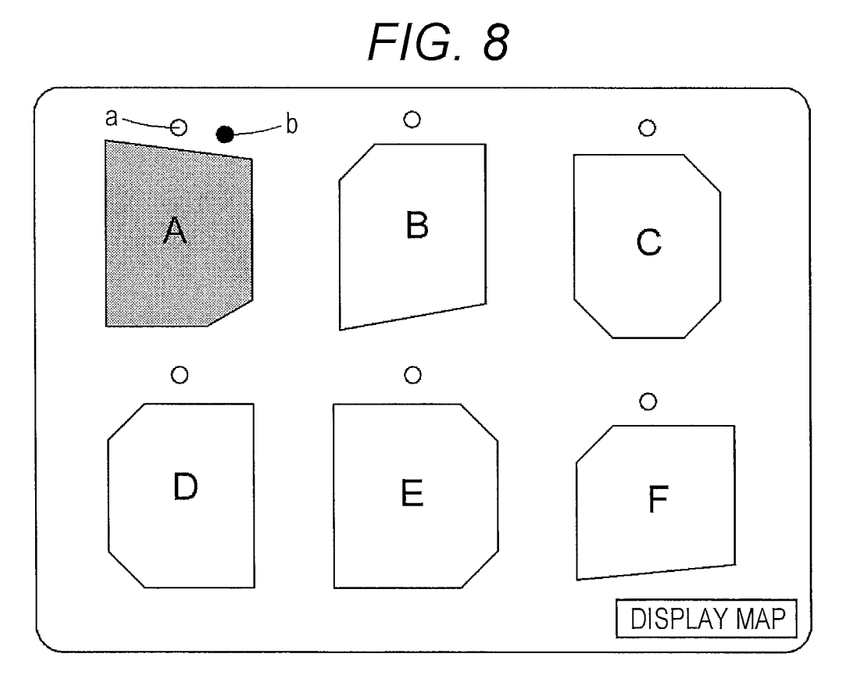
FIG. 8 is a view of image display contents indicating a selected field and positions of a reference station.

More specifically, in a case where there is a plurality of work target fields (A to F) as depicted in FIG. 7, the reference station 19 is placed for each of the fields as described above. Each of the reference stations 19 needs to constantly be placed at a position preliminarily precisely ascertained. The reference station management unit 20 is configured to manage map data of the field and position data of the reference station 19 in association with each other for each of the fields. In an exemplary case where the master work vehicle 1 and the slave work vehicle 2 are located in the field (A) out of the plurality of fields, as depicted in FIG. 8, the liquid-crystal display 30 displays, as map information, the plurality of fields (A to F), map data of the field A (the field where the work vehicles are currently located) selected from the fields (A to F), and the position of the reference station 19 for the field A, such that relative positions are visually discriminated.

The liquid-crystal display 30 further displays the fields, the set position of the reference station 19, and the current position of the reference station 19 in the map. In a case where the position of the reference station 19 is set during previous work and is stored in the storage device 29, such a position (a) preliminarily set and stored and a current position (b) of the newly placed reference station 19 are displayed as map information on an identical screen as depicted in FIG. 8. Although the position information on the reference station 19 is based on a position measurement result of single point positioning by the GPS and thus does not have very high positioning accuracy, it enables determination of whether or not the stored position (a) and the current position (b) of the newly placed reference station 19 are largely distant from each other.

The reference station management unit 20 and the liquid-crystal display 30 thus configure a position information management unit 100 that manages map data of a work target field and position data of the reference station 19 for the field in association with each other.

The target route setting unit 18 is configured to set a target travel route of each of the own vehicle and the slave work vehicle 2 in accordance with the map data of the field and a work parameter. Examples of the work parameter include various types of data such as a work width of the tilling device 9, a minimum turning radius of the travel vehicle body 4, and a set value of an overlapped work width of the master work vehicle 1 and the slave work vehicle 2.

As depicted in FIG. 2, the target travel routes are set such that the master work vehicle 1 travels antecedently, the slave work vehicle 2 travels alongside the master work vehicle 1, and the slave work vehicle 2 has a work track overlapped by a predetermined amount with a work track of the master work vehicle 1. A travel route is followed by repetition of straight first-half travel, turn (U-turn) travel, straight second-half travel in parallel with the first-half travel with a uniform space provided therebetween, and turn (U-turn) travel. The headland HL serves as a turn area for work travel in the center work field CL. Though not depicted, ground work in the headland HL is executed by straight travel along the longitudinal side of the headland HL. The present embodiment is not limitedly applied to the case where the master work vehicle 1 travels antecedently and the slave work vehicle 2 travels followingly, but is also applicable to a case where the slave work vehicle 2 travels antecedently and the master work vehicle 1 travels followingly.

The target route setting unit 18 of the master work vehicle controller 15 included in the master work vehicle 1 is configured to set a target travel route Tp of the own vehicle as well as a target travel route Tc of the slave work vehicle 2 (the other vehicle). As depicted in FIG. 3, the target travel route Tc of the slave work vehicle 2 is set to be displaced alongside the target travel route Tp of the master work vehicle 1.

The master communication unit 21 transmits, to the slave work vehicle 2, specifically, to a slave communication unit 31 to be described later, work travel information, namely, map data of a work target field, and the target travel routes Tc and Tp of the own vehicle and the slave work vehicle 2, respectively, set by the target route setting unit 18.

The travel vehicle body 4 includes a travel operation unit 32 for operation of the transmission mechanism, and a steering operation unit 33 for free change of the steering angle of the front wheels 3a. Though not depicted, the travel operation unit 32 includes a plurality of actuators for operation of the gearbox, the forward/backward travel switcher, the brake, and the like, and is configured to freely change vehicle speed, a vehicle body travel direction, and the like. The steering operation unit 33 includes an actuator like an electric motor for operation of the steering angle or the like of the front wheels 3a, and is configured to change the travel direction of the travel vehicle body 4 for straight travel, left turn, and right turn, and appropriately change the steering angle of the front wheels 3a during turn. The travel vehicle body 4 further includes a work operation unit (not depicted) for drive operation of the work clutch, a lift cylinder, and the like.

The travel control unit 17 controls driving the travel operation unit 32 and the steering operation unit 33 so that the travel vehicle body 4 travels along the target travel route Tp set by the target route setting unit 18.

The travel control unit 17 controls the travel operation unit 32 and the steering operation unit 33 so that the master work vehicle 1 moves to a start point of the target travel route Tp and then moves along the set target travel route Tp when start is commanded. The travel control unit 17 further controls the work operation unit so that tilling work is executed on a straight travel route and tilling work is not executed during turn travel.

Control Configuration of Slave Work Vehicle 2

Similarly to the master work vehicle 1, the slave work vehicle 2 includes a GPS antenna 23, a GPS data processor 24, a liquid-crystal display 30, a travel operation unit 32, a steering operation unit 33, and the like. The slave work vehicle 2 further includes a slave work vehicle controller 34 that is configured similarly to the master work vehicle controller 15.

Similarly to the master work vehicle controller 15, the slave work vehicle controller 34 includes an own vehicle position calculation unit 16, a travel control unit 17, a reference station management unit 20, and the slave communication unit 31. Each of the own vehicle position calculation unit 16, the travel control unit 17, and the reference station management unit 20 can operate in cooperation with hardware, but a function of each of the units is achieved by a computer program. More specifically, the slave work vehicle controller 34 includes a CPU (circuitry) 34P. Programs of the own vehicle position calculation unit 16, the travel control unit 17, and the reference station management unit 20 are stored in a storage device (a memory) 29 of the slave work vehicle controller 34 and executed by the CPU (circuitry) 34P. The slave communication unit 31 is configured by a device for wireless information transmission by means of a radio wave or the like, and is wirelessly connected to the master communication unit 21 so as to identify the communication target as well as transmit and receive work travel information. The slave work vehicle controller 34 does not have a function of setting a target travel route. The slave work vehicle controller 34 is configured to control a travel state so that the slave work vehicle travels along the target travel route Tc set by the target route setting unit 18 included in the master work vehicle controller 15.

Control Details

Figure 5:
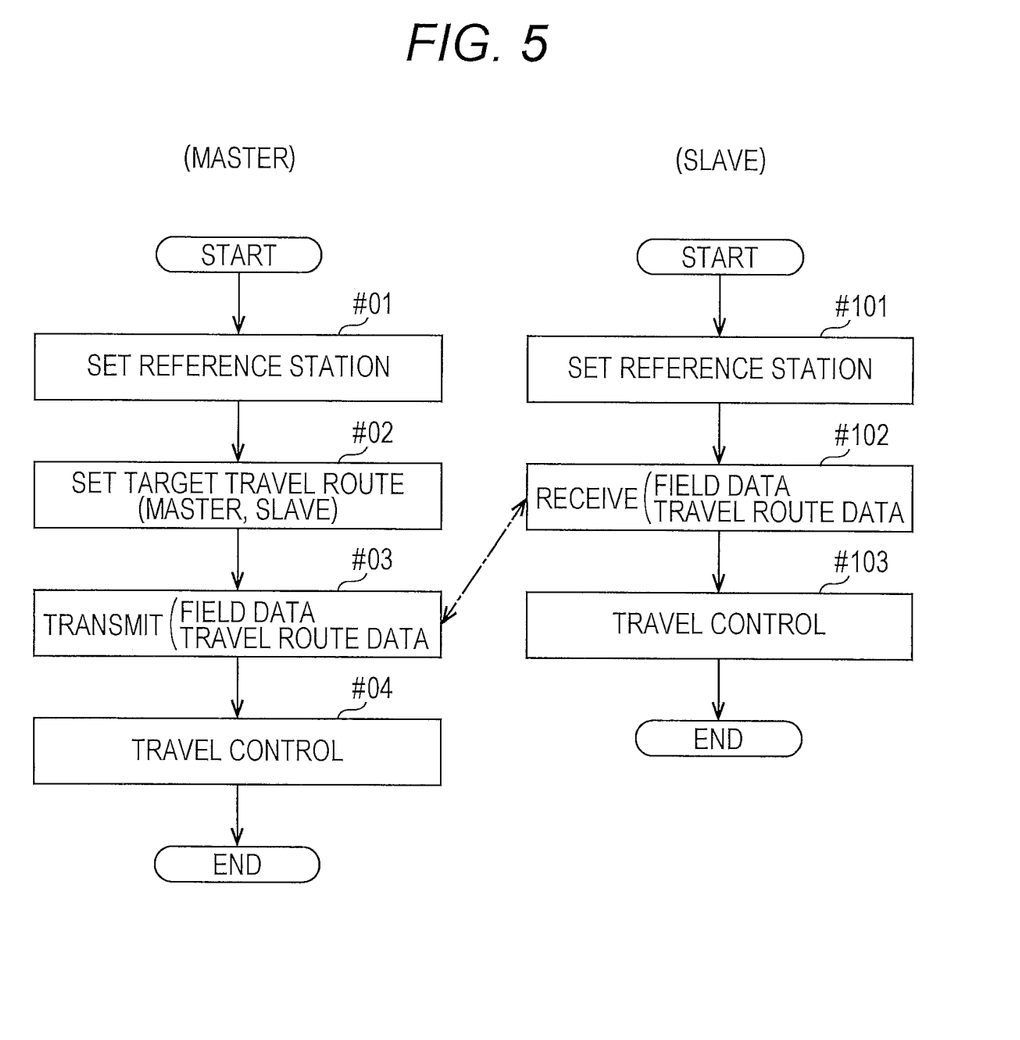
FIG. 5 is a flowchart of control operation.

Control operation according to the present embodiment will be described next with reference to the flowcharts in FIGS. 5 and 6.

The reference station 19 positioned adjacent to a work target field is set for actuation of the RTK-GPS (steps #1 and #101). Each of the master work vehicle 1 and the slave work vehicle 2 independently sets the reference station 19.

Figure 6:
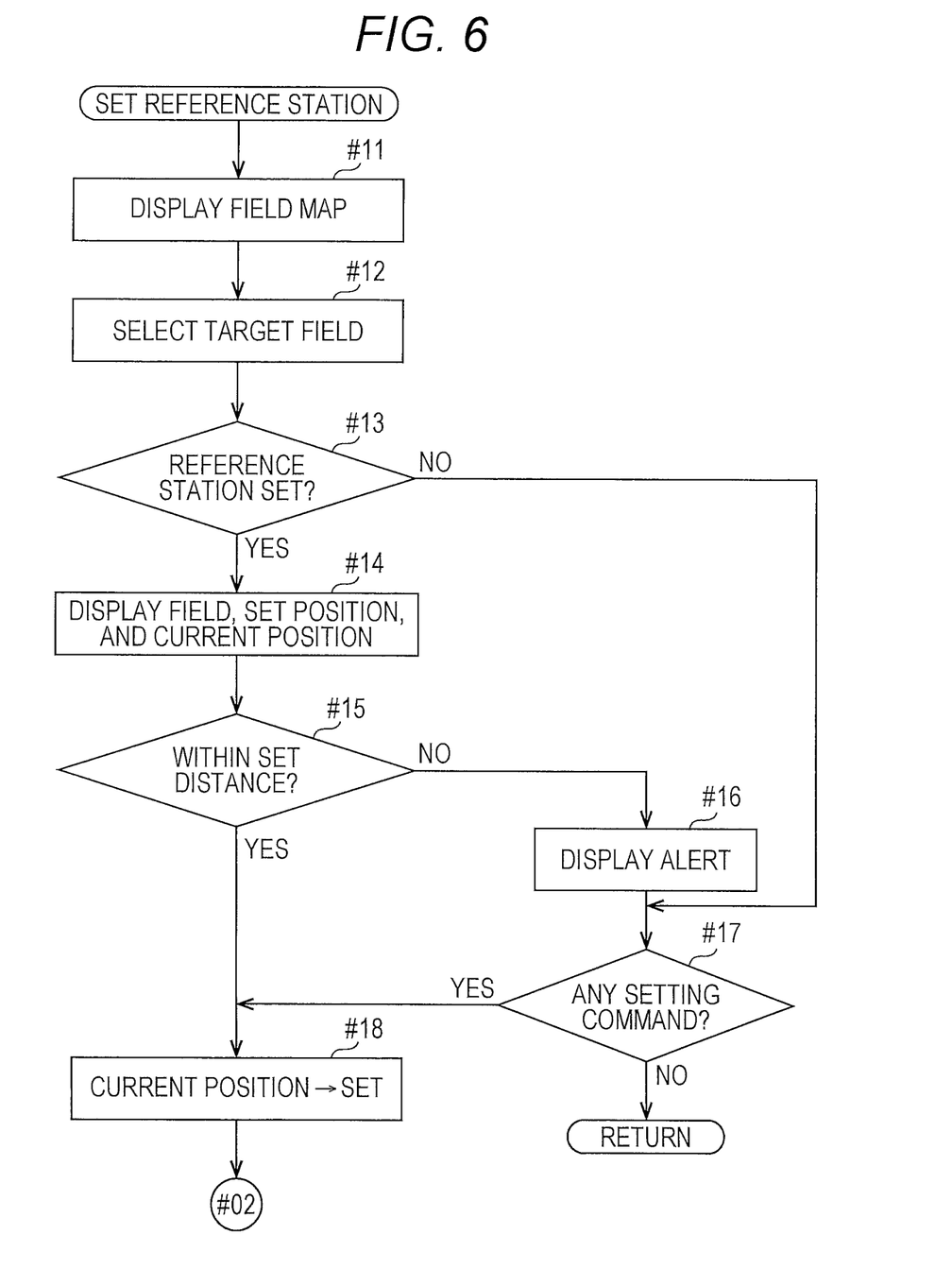
FIG. 6 is another flowchart of control operation.

The reference station 19 is set as depicted in FIG. 6. When setting of the reference station 19 starts, the liquid-crystal display 30 displays, as map information, a plurality of work target fields if applicable as depicted in FIG. 7 (step #11). The touch panel liquid-crystal display 30 is operated to select a current work target field out of the plurality of fields (step #12). When the field is selected, map data of the selected field and the position of the reference station 19 for the selected field are displayed as map information such that relative positions are visually discriminated as in FIG. 8. In a case where the position of the reference station 19 is preliminarily set with respect to the field, the map data of the field, the set position (a) of the reference station 19, and the position (b) of the newly placed reference station 19 are displayed on the screen (steps #13 and #14).

In a case where the preliminarily set position of the reference station 19 and the current position of the newly placed reference station 19 are distant from each other by at least a set distance, the worker is alerted by means of alert display, though not depicted (steps #15 and #16). The worker can place again the reference station 19 at the preliminarily set position, or can update the set position to the newly placed position. In a case where the set position and the current position are distant from each other by at least the set distance but the set position is updated to the newly placed position or the like, such a command can be made with use of an operation unit of the touch panel liquid-crystal display 30, though not depicted (step #17). Setting can similarly be made also in a case where the position of the reference station 19 is not preliminarily set with respect to the field (step #18). In a case where update setting is not made even through the set position and the current position are distant from each other by at least the set distance, the flow returns to step #11.

After the reference station 19 is set, the master work vehicle 1 subsequently executes target travel route setting (step #2). As described above, the master work vehicle 1 is configured to set the target travel route Tp of the own vehicle (the master work vehicle 1) as well as the target travel route Tc of the slave work vehicle 2. Specifically, as depicted in FIG. 2, the target travel route Tc of the slave work vehicle 2 is set to be displaced by a set amount alongside the target travel route Tp of the master work vehicle 1. The target travel routes Tp and Tc are not limited to those depicted in FIG. 2 but can be set differently as long as the master work vehicle 1 and the slave work vehicle 2 traveling side by side can execute ground work in the field.

When the target travel routes Tp and Tc are set for the master work vehicle 1 and the slave work vehicle 2, respectively, the communication unit 21 wirelessly transmits, to the slave communication unit 31, data of the target travel routes Tp and Tc (step #3). The slave communication unit 31 receives the data transmitted from the master communication unit 21 (step #102).

After the target travel routes Tp and Tc are set at the master work vehicle 1, the master work vehicle 1 and the slave work vehicle 2 start travel control of controlling the travel states so that the master work vehicle 1 and the slave work vehicle 2 travel along the target travel routes Tp and Tc, respectively (steps #4 and #103). Specifically, the travel operation units 32 are controlled so that the travel vehicle bodies 4 travel along the target travel routes Tp and Tc. The work clutch and the lift cylinder are controlled so that each of the tilling devices 9 executes tilling work during straight travel in the center work field CL and the tilling device 9 stops tilling work and is lifted upward during turn travel in the headland HL.

If the reference station 19 is not set in step #1, the flow cannot proceed to step #2 and thus does not transition to the travel control in step #4. Accordingly, the own vehicle position calculation unit 16 according to the present embodiment is configured not to execute position calculation if position information on the reference station 19 is not set at the position information management unit 100.

Though not depicted, the master work vehicle controller 15 of the master work vehicle 1 is configured to be switchable between an automatic mode in which the travel control unit 17 controls the travel operation unit 32 to achieve automatic travel along the target travel route Tp and a manual mode in which such automatic control is not executed and the vehicle body can travel in accordance with manual steering.

In the state where the master work vehicle controller 15 is switched to the manual mode, the worker boarding at the steering unit 5 can manually steer the vehicle. Even in such a case where the master work vehicle 1 is of a manned steering type, the slave work vehicle 2 is of an unmanned steering type and is automatically controlled to travel along the target travel route while following the master work vehicle 1.

The worker on board can optionally monitor the travel state or manually correct the travel state in the state where the master work vehicle controller 15 is switched to the automatic mode.

The embodiment of the present invention provides a work-vehicle position measurement device characterized by including a ground reference station configured to receive a radio wave from a satellite, measure an own position, and transmit a result of the measurement to outside, and a work vehicle including: a position calculation unit configured to execute position calculation of obtaining an own vehicle position in accordance with received information via the radio wave from the satellite and transmitted information sent from the reference station; a travel control unit configured to control a travel state of a vehicle body so that the vehicle body travels along a set route in accordance with a result of the calculation by the position calculation unit; and a position information management unit configured to manage map data of a work target field and position data of the reference station for the field in association with each other.

According to the embodiment of the present invention, the reference station transmits the measurement result to the work vehicle, and the position calculation unit included in the work vehicle obtains the own vehicle position in accordance with the received information via the radio wave from the satellite and the transmitted information sent from the reference station. The received information, which includes the position information on the reference station, enables accurate measurement of the own vehicle position. The position information management unit manages the map data of the work target field and the position data of the reference station for the field in association with each other.

In an exemplary case where the reference station is configured to be placed at a changeable position and is determined to be placed identically at a previously placed position, the travel control unit can readily start controlling the travel state of the vehicle body. In other words, travel state control of the vehicle body can readily start efficiently with effective use of previously set information. In another case where the worker places the reference station erroneously at a position different from a previously placed position and the position information management unit determines the error, there can be taken measures such as informing the worker of the error or setting again the newly placed position as a proper position.

The reference station can constantly be placed at an appropriate position and the work vehicle can accurately obtain the own vehicle position even in the case where the reference station is configured to be placed at a changeable position.

According to a preferable aspect of the present invention, the position information management unit includes a storage device configured to store position information on the reference station which is preliminarily set with respect to the field, and a display device configured to display the field and a position of the reference station in a map.

The storage device stores the position information on the reference station for the field in this configuration. The reference station can thus be placed at an appropriate position even in a case where position is measured again after elapse of a long time from completion of the work in the field. Furthermore, the display device can display the work target field and the position of the reference station for the field in the map. In accordance with the map displayed by the display device, the worker can easily visually recognize a relative position of the reference station to the field. The worker can thus easily set the reference station at an appropriate position without difficulty.

According to a preferable aspect of the present invention, the reference station is portable to be placed at an arbitrary position, and the display device is configured to display the field, a set position of the reference station, and a current position of the reference station in the map.

The reference station can be placed at any appropriate position in this configuration. The reference station can thus be mounted and supported in stable orientation by being placed at an easily placeable flat position adjacent to the field, for example. The display device displays the field, the already set position of the reference station, and the appropriate current position of the newly placed reference station in the map. The worker visually checks display contents of the display device to easily find a difference between the set position and the current position, and can easily take measures such as moving the reference station to the set position.

According to a preferable aspect of the present invention, the position information management unit is configured to update to set the current position of the reference station as a position of the reference station for the field in accordance with a setting command.

This configuration enables updating to set the current position of the reference station as the position of the reference station in accordance with the setting command, when the already set position of the reference station is distant from the appropriate current position of the newly placed reference station.

In an exemplary case where the reference station can be mounted and supported at the current position in stabler orientation or positioning accuracy can be improved, the work vehicle can obtain the own vehicle position accurately with the current position of the reference station set as a new position.

According to a preferable aspect of the present invention, the position information management unit is configured to manage map data of the field and position data of the reference station for each of a plurality of fields, and the display device is configured to display, as map information, the plurality of fields and a position of the reference station selected from the plurality of the fields.

This configuration achieves, with the plurality of fields, management of the map data of the field and the position data of the reference station for each of the fields. With the work vehicle being located in the current work target field, the field provided with the own vehicle can be recognized as a field selected from the plurality of fields. The position information management unit thus manages the map data of the field selected from the plurality of fields and the position data of the reference station for the field. The display device displays, as the map information, the plurality of fields and the position of the reference station selected from the plurality of the fields.

The worker can correctly determine which one of the fields in the map is selected and where the reference station for the field is positioned in accordance with the display contents of the display device. Even in an exemplary case where there are fields adjacent to each other and it is hard to visually determine which one of the fields corresponds to the reference station, the information displayed by the display device enables easy determination.

According to a preferable aspect of the present invention, the position calculation unit is configured not to execute position calculation when position information on the reference station is not set by the position information management unit.

Position calculation is not executed when the position information on the reference station is not set in this configuration. The position calculation unit can thus preferably control to cause the vehicle body to travel along the set route only in accordance with the received information via the radio wave from the satellite, without any disadvantage of obtaining the own vehicle position at low positioning accuracy.

OTHER EMBODIMENTS (1) The display device (the liquid-crystal display 30) according to the above embodiment is configured to display the field, the position set for the reference station 19 (the set position), and the current position of the reference station 19 in the map. Alternatively, the display device can be configured to display only the field and the set position and alert that the current position is distant from the set position, or can be configured to display only the field and the current position and alert that the current position is distant from the set position. The display device can still alternatively be configured to switch display contents between displaying only the field and the set position and displaying only the field and the current position.

(2) The position information management unit 100 according to the above embodiment is configured to update to set the current position of the reference station 19 as the position of the reference station 19 for the field in accordance with a setting command. The position information management unit 100 can alternatively be configured to immediately update to set the current position of the reference station 19 as the position of the reference station 19 for the field when position data of the set position and the current position of the reference station 19 is measured and these positions are distant from each other by at least the set distance.

(3) The reference station 19 according to the above embodiment is configured to be placed at any appropriate position. The reference station 19 can alternatively be configured variously, for example, to be moved along a rail built on the ground surface or the like to be placed at a position achieving highest radio wave reception sensitivity.

(4) The position information management unit 100 according to the above embodiment includes the storage device 29 configured to store position information on the reference station 19 preliminarily set for the field. The position information can alternatively be stored and held by an external device. For example, the position information can be stored by a detachable external memory, or can be transmitted by means of a wireless communication means, via Internet connection, or the like to be stored by the external device.

(5) The position information management unit 100 according to the above embodiment includes the liquid-crystal display 30 functioning as the display device configured to display the field and the position of the reference station 19 in the map. The display device can alternatively be of any other appropriate type, like an organic EL display device or a fluorescent display tube. The position information management unit 100 can still alternatively be configured, instead of or in addition to including the display device, to output position management information in the form of audio information or with use of a printer.

(6) The own vehicle position calculation unit 16 according to the above embodiment is configured not to execute position calculation if position information on the reference station 19 is not set by the position information management unit 100. Alternatively, the own vehicle position calculation unit 16 can be configured to execute position calculation even when position information on the reference station 19 is not set, and position information on the reference station 19 can be set simultaneously with the position calculation.

(7) The above embodiment exemplifies the case where the master work vehicle 1 and the slave work vehicle 2 travel. Alternatively, an automatic traveling work vehicle configured similarly to the slave work vehicle 2 can travel solo, or a plurality of automatic traveling work vehicles can travel.

(8) The above embodiment exemplifies the case where the work vehicles each include the position information management unit 100 provided with the display device (the liquid-crystal display 30). The present invention is not limited to this configuration, but the position information management unit 100 can alternatively be included in a portable terminal device carried by the worker. The position information management unit 100 can still alternatively be provided at a management controller to be placed on the ground at a position far away from the work vehicle.

INDUSTRIAL APPLICABILITY

The embodiment of the present invention is applicable to a work vehicle such as a tractor, a rice transplanter, or a combine harvester, configured to work in a field.

Obviously, numerous modifications and variations of the present invention are possible in light of the above teachings. It is therefore to be understood that within the scope of the appended claims, the invention may be practiced otherwise than as specifically described herein.

What is claimed is:

1. A work-vehicle position measurement system comprising:
  a reference station provided at any position on a ground in a field and configured to measure a current position of the reference station via a radio wave from a satellite and to transmit reference information including the current position; and
  a work vehicle comprising:
    circuitry configured to
      obtain a calculated position of the work vehicle based on satellite information from the satellite and the reference information transmitted from the reference station,
      control the work vehicle to travel along a predetermined travel route in the field based on the calculated position of the work vehicle, and
      relate the current position to map data of the field;
    a memory configured to store a reference position for the reference station which is preliminarily set to correspond to the field; and
    a display to display a map showing the field, a first display content located at and representing the current position of the reference station in relation to the field, and a second display content located at and representing the reference position for the reference station in relation to the field.

2. The work-vehicle position measurement system according to claim 1,
wherein the reference station is portable to be placed at the any position.

3. The work-vehicle position measurement system according to claim 2, wherein the circuitry is configured to update the reference position to correspond to the field by setting the current position of the reference station as the reference position after a setting command is received.

4. The work-vehicle position measurement system according to claim 1,
wherein the circuitry is configured to manage map data of fields, and data of reference positions to correspond to the fields, respectively, and
wherein the display is configured to display, as map information, a field selected from the fields and the reference position for the reference station to correspond to the field selected.

5. The work-vehicle position measurement system according to claim 1, wherein the circuitry is configured not to obtain the calculated position of the work vehicle when the reference position for the reference station is not preliminarily set.

6. A work vehicle comprising:
position calculation circuitry configured to obtain a calculated position of the work vehicle based on satellite information from a satellite and reference information transmitted from a reference station which is provided at any position on a ground in a field and which is configured to measure a current position of the reference station via a radio wave from a satellite and to transmit reference information including the current position, the reference information including the current position;
vehicle control circuitry configured to control the work vehicle to travel along a predetermined travel route in the field based on the calculated position of the work vehicle;
data management circuitry configured to relate the current position to map data of the field;
a memory configured to store a reference position for the reference station which is preliminarily set to correspond to the field; and
a display to display a map showing the field, a first display content located at and representing the current position of the reference station in relation to the field, and a second display content located at and representing the reference position for the reference station in relation to the field.

7. A work-vehicle position measurement method comprising:
placing a reference station at any position on a ground in a field, the reference station being configured to measure a current position of the reference station via a radio wave from a satellite;
transmitting reference information including the current position from the reference station;
obtaining a calculated position of the work vehicle based on satellite information from the satellite and the reference information;
controlling the work vehicle to travel along a predetermined travel route in the field based on the calculated position of the work vehicle;
relating the current position to map data of the field;
storing a reference position for the reference station which is preliminarily set to correspond to the field; and
displaying a map showing the field, a first display content located at and representing the current position of the reference station in relation to the field, and a second display content located at and representing the reference position for the reference station in relation to the field.

8. The work-vehicle position measurement system according to claim 1, wherein circuitry configured to:
determine whether the current position and the reference position are greater than a set distance from each other, and
display an alert when the current position and the reference position are greater than the set distance from each other.

9. The work-vehicle according to claim 6, further comprising:
position information management circuitry configured to determine whether the current position and the reference position are greater than a set distance from each other,
wherein an alert is displayed when the current position and the reference position are greater than the set distance from each other.

10. The work-vehicle position measurement method according to claim 7, further comprising:
determining whether the current position and the reference position are greater than a set distance from each other; and
displaying an alert when the current position and the reference position are greater than the set distance from each other.

\* \* \* \* \*